J. W. LUCAS.
Grain-Drill Cleaner.
No. 208,982.        Patented Oct. 15, 1878.
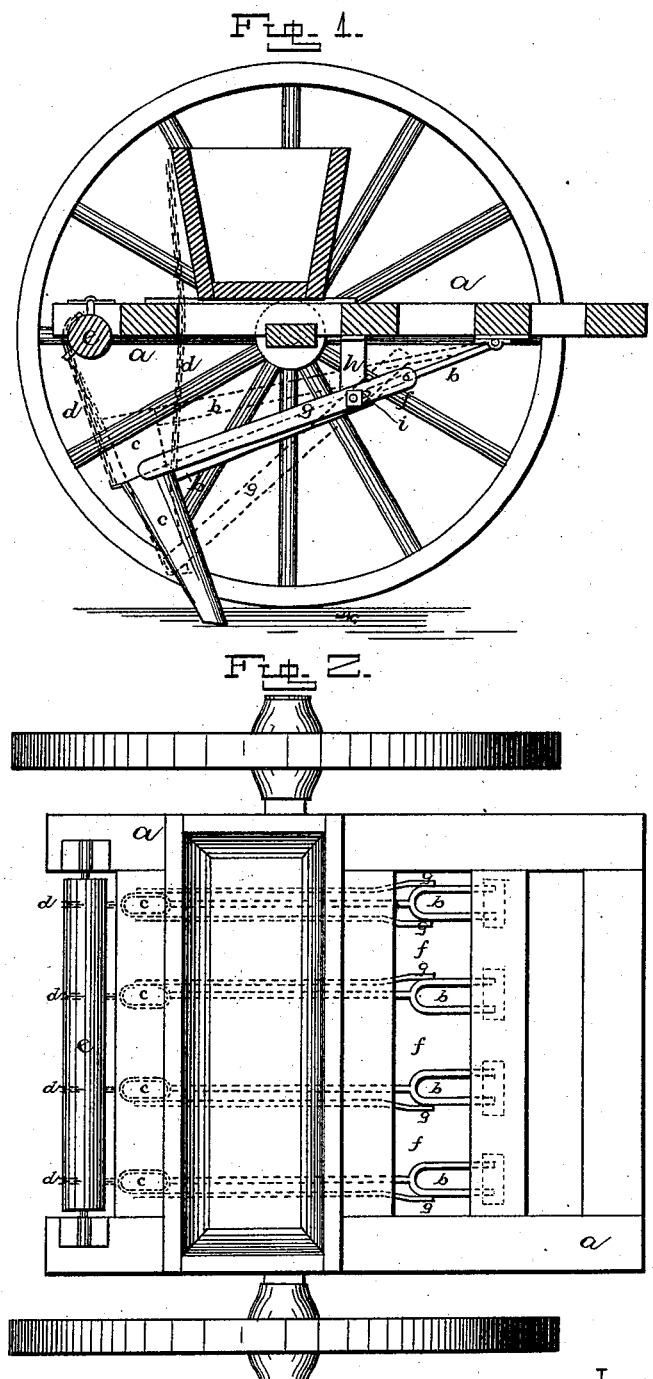

UNITED STATES PATENT OFFICE.

JOSEPH W. LUCAS, OF LEESBURG, KENTUCKY.

IMPROVEMENT IN GRAIN-DRILL CLEANERS.

Specification forming part of Letters Patent No. 208,982, dated October 15, 1878; application filed September 6, 1878.

*To all whom it may concern:*

Be it known that I, J. W. LUCAS, of Leesburg, in the county of Harrison and State of Kentucky, have invented certain new and useful Improvements in Grain-Drill Cleaners; and I do hereby declare the following to be a full, clear, and exact description of the invention, such as will enable others skilled in the art to which it pertains to make and use it, reference being had to the accompanying drawings, which form part of this specification.

My invention relates to an improvement in seeding-machines; and it consists in combining with the drag-bars, to which the seed-tubes are secured, pivoted levers, that move when the bars move, and move only in an opposite direction at their rear ends from the direction in which the seed-tubes move, so that when the seed-tubes are raised upward the levers will move downward along their sides and scrape away corn-stalks or other rubbish that may have become entangled thereon, as will be more fully described hereinafter.

The accompanying drawings represent my invention.

Figure 1 is a sectional view, and Fig. 2 is a plan or top view.

*a* represents a seeding-machine of any desired construction; *b*, the drag-bars, and *c* the seed-tubes. These tubes are raised and lowered by means of the chains *d* and the eccentrically-pivoted lever *e*.

Pivoted to the front ends of the drag-bars, at *f*, are the long straight levers *g*, which are pivoted again near their centers to the hangers *h*, which project downward a suitable distance from the under side of the seeder. At the point where the pivotal bolt passes through the hanger and lever a slot, *i*, is made, so as to allow the levers a slight end play.

The parts being thus connected together, whenever the seed-tubes are raised upward, either one at a time or all together, the rear end of the lever or levers, which reach back to the rear edge of the seed-tubes and press or bear slightly against one side thereof, move downward, so as to sweep or brush away any rubbish, cornstalks, or other obstructions that may have caught upon the tube or tubes. As the levers and tubes only move in contrary directions, when the tubes are raised upward the levers reach near to the ground, and when the tubes are in the ground the levers are far up out of the way. A single movement of any tube or all of them will cause the lever to free it of any obstruction which may be clinging to it.

Having thus described my invention, I claim—

The combination of the drag-bars and seed-tubes attached thereto with the levers *g*, the tubes and levers being made to move in opposite directions, substantially as shown.

In testimony that I claim the foregoing I have hereunto set my hand this 14th day of August, 1878.

J. W. LUCAS.

Witnesses:
   H. F. CROMWELL,
   JNO. J. WILLIAMS.